United States Patent [19]
Fisher

[11] Patent Number: 5,572,229
[45] Date of Patent: Nov. 5, 1996

[54] HEAD-MOUNTED PROJECTION DISPLAY SYSTEM FEATURING BEAM SPLITTER AND METHOD OF MAKING SAME

[75] Inventor: Ralph W. Fisher, Park City, Utah

[73] Assignee: Evans & Sutherland Computer Corp., Salt Lake City, Utah

[21] Appl. No.: 144,169

[22] Filed: Oct. 26, 1993

Related U.S. Application Data

[63] Continuation-in-part of Ser. No. 690,173, Apr. 22, 1991, abandoned.

[51] Int. Cl.⁶ ........................................................ G09G 5/00
[52] U.S. Cl. .................................... 345/8; 345/9; 348/53
[58] Field of Search ........................... 345/7, 8, 9; 434/38, 434/40, 43, 44; 359/13, 14, 630, 631; 340/980; 348/53

[56] References Cited

U.S. PATENT DOCUMENTS

| | | |
|---|---|---|
| 3,709,581 | 1/1973 | McGlasson . |
| 4,016,658 | 4/1977 | Porter et al. . |
| 4,028,725 | 6/1977 | Lewis . |
| 4,048,653 | 9/1977 | Spooner . |
| 4,119,956 | 10/1978 | Murray . |
| 4,303,394 | 12/1987 | Berke et al. . |
| 4,340,878 | 7/1982 | Spooner et al. . |
| 4,343,037 | 8/1982 | Bolton . |
| 4,348,185 | 9/1982 | Breglia et al. . |
| 4,348,186 | 9/1982 | Harvey et al. . |
| 4,349,815 | 9/1982 | Spooner . |
| 4,437,113 | 3/1984 | Lee et al. . |
| 4,439,157 | 3/1984 | Breglia et al. . |
| 4,446,480 | 5/1984 | Breglia et al. . |
| 4,634,384 | 1/1987 | Neves et al. . |
| 4,657,512 | 4/1987 | Mecklenborg . |
| 4,714,428 | 12/1987 | Bunker et al. . |
| 4,743,200 | 5/1988 | Welch et al. . |
| 4,811,245 | 3/1989 | Bunker et al. . |
| 4,897,715 | 1/1990 | Beamon, III ................................ 345/8 |
| 4,930,888 | 6/1990 | Freisleben et al. . |
| 4,969,714 | 11/1990 | Fournier, Jr. et al. . |
| 4,994,794 | 2/1991 | Price et al. . |
| 5,124,821 | 6/1992 | Antier et al. ............................. 359/14 |

Primary Examiner—Steven Saras
Attorney, Agent, or Firm—Darby & Darby P.C.

[57] ABSTRACT

A head-mounted projection display system featuring a beam splitter displays a simulated environment to an observer using a light-weight, low-cost, head-mounted projector and a retro-reflective screen. The display system optically co-locates the projector with the observer's eyes for effective use of either curved or flat retro-reflective screens. High screen gain achieved by the head-mounted projection display system makes inexpensive projector sources such as a cathode ray tube feasible. An alternative head-mounted display system also incorporating beam splitters produces an unlimited horizontal field of view, but with limited binocular overlap, while using multiple head-mounted image sources for each eye. A method of providing the head-mounted display system also is disclosed.

14 Claims, 3 Drawing Sheets

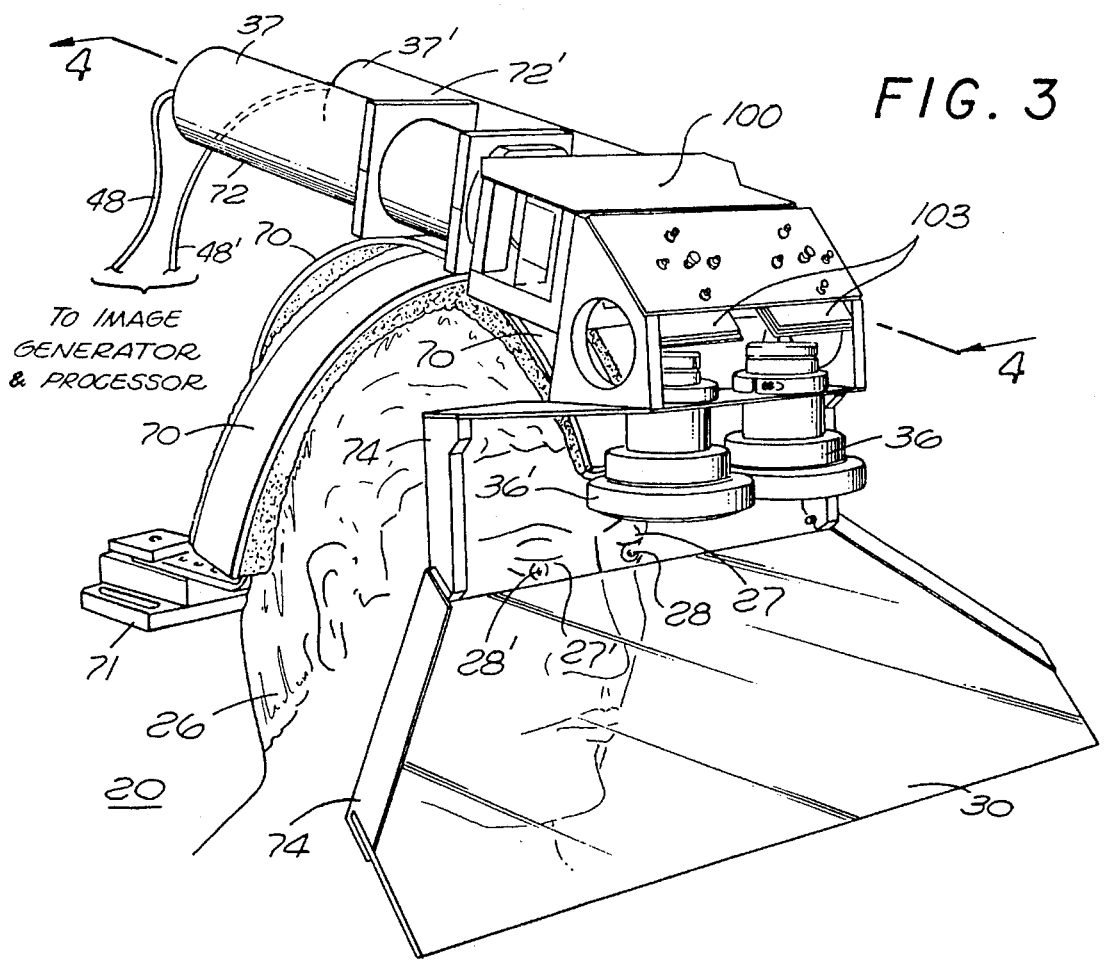
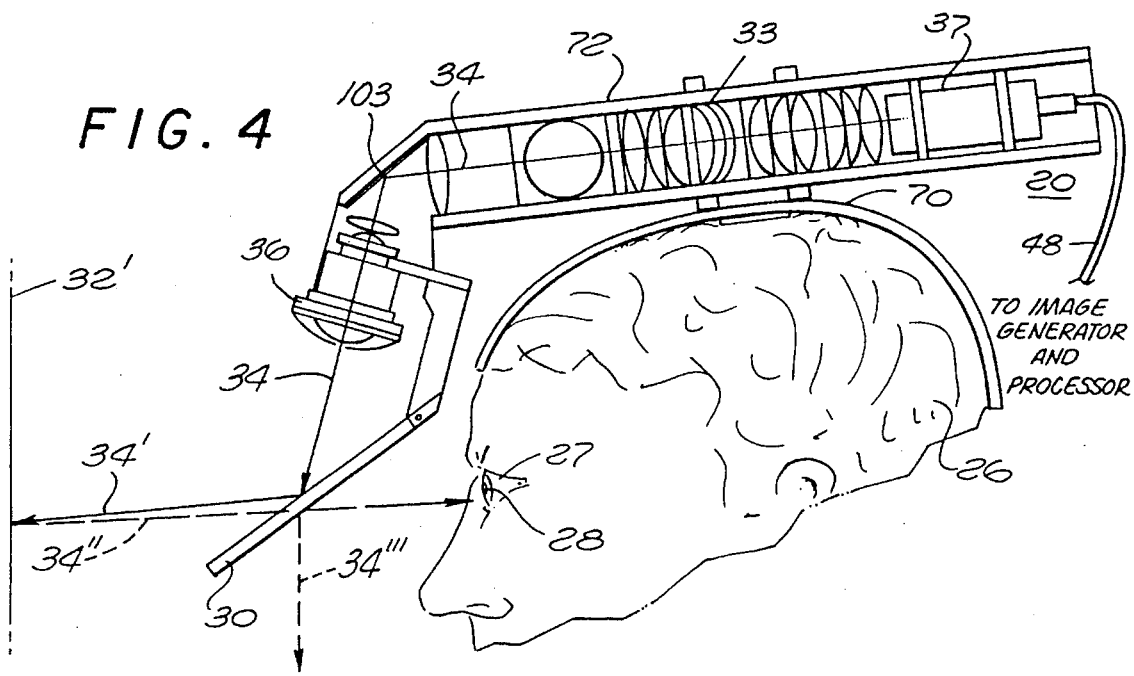

HEAD-MOUNTED PROJECTION DISPLAY SYSTEM FEATURING BEAM SPLITTER AND METHOD OF MAKING SAME

RELATED SUBJECT MATTER

This application is a continuation-in-part of application Ser. No. 07/690,173 filed Apr. 22, 1991, now abandoned and entitled "HEAD-MOUNTED PROJECTION DISPLAY SYSTEM FEATURING BEAM SPLITTER AND METHOD OF MAKING SAME."

BACKGROUND OF THE INVENTION

The present invention relates to a head-mounted projection display system providing a wide field of view with unlimited binocular overlap or unlimited field of view through limited binocular overlap, more particularly, to both systems featuring a beam splitter.

Experience is expensive. Particularly, when the experience involves man-machine interface between a skilled pilot and a multi-million dollar aircraft.

Today's high performance aircraft have become more and more complex, and a need exists for more extensive specialized pilot training. To obtain such training an inexperienced pilot, commercial or military, must either actually be trained in the aircraft he is to fly or be provided with training in a simulator for that aircraft.

However, there are certain emergency procedures and maneuvers that, as a practical matter, simply cannot be experienced by training in an actual aircraft because of the real life danger of pilot injury or structural damage. Consequently, as a practical matter, some situations can only be experienced in a simulator. This is particularly true of maneuvers that involve emergency procedures.

Aircraft simulators are called upon to take on more and more of the aircraft training mission. For such training to be effective, the aircraft simulator must faithfully reproduce the simulated environment that the pilot trainees face in an actual flight. The pilot must "see" the terrain over which he flies. He must appreciate obstacles on the ground as well as in the air. Through his eyes, his brain must assimilate visual images and cues received from the simulated environment surrounding his aircraft.

The desire to more effectively support pilot vision in both a field of view and image resolution of the simulated environment has led to the development of a wide variety of simulator display concepts.

One approach provides a projection simulator display achieving wide field of view by incorporating several large, expensive projectors collectively producing an image on the inside of a 20 to 40-foot dome to be viewed by an observer located close to the dome center.

U.S. Pat. No. 4,657,512, issued Apr. 14, 1987 to R. A. Mecklenborg, entitled, "Visual System with Filter for a Simulator" describes a vehicle simulator display system for training two observers such as a pilot and co-pilot seated side-by-side viewing compound images projected on a large curved screen. Structurally, the display system includes two projectors, each of which uses a polarizer to polarize the individual light images in opposite directions in a circular manner. The vehicle simulator display system of the Mecklenborg patent uses two large off-screen projectors pointed at a large dome-like reflective screen. A reflective viewing screen is curved and specially treated to reflect impinging light energy. The Mecklenborg display system provides a wide field of view to the screen observers. However, the cost of an overall display system is exorbitant due to the large off-screen projectors and domed retro-reflective screen. And, the conventional multiple projector process produces only reasonable scene brightness.

An alternative method, using head or helmet-mounted displays, reduces the overall system cost and enables increasing projected scene brightness by projecting the simulated image directly into the observer's eye.

U.S. Pat. No. 4,349,815 issued Sep. 14, 1982, to A. M. Spooner, entitled, "Head-Movable Frame-Scanner for Head-Coupled Display", describes a helmet-mounted display system using a curved retro-reflective screen and two image projectors.

Unfortunately, in the inexpensive helmet-mounted system, the requirements for comfortable observer viewing, good eye relief, reasonable pupil size and full binocular viewing are not compatible with the desired wide fields of view. Field of view for a helmet-mounted display system conventionally is limited to 20 to 60 degrees for each eye. Visual fields traditionally have been achieved only by providing each eye with a separate field that results in limited binocular overlap.

It would be advantageous to combine the best features of both the projection and the helmet-mounted displays to produce a wide field of view display with an inset format and provide comfortable observer viewing and low overall system cost.

SUMMARY OF THE INVENTION

The present invention provides a head-mounted projection display system featuring a beam splitter to attain co-location of the display and resolve the problem of high cost and the narrow field of view attendant with conventional head-mounted image display systems.

Using direct image display into the eyes of an observer, this invention produces simulated viewing of pre-prepared events in a low cost, effective manner with a wide field of view.

More particularly, the invention provides a head-mounted projection display system that has: a head mount worn by an observer; a head position sensor coupled to the head mount to provide angular position signals indicative of the observer's angular head position; an image generator to receive the angular position signals and generate background and inset display signals of binocular images; a transmitter that receives the generated display signals; and a beam splitter selectively transmissive, connected to the head mount to reflect co-located binocular images to a retro-reflective viewing screen, then pass the images from the retro-reflective screen back into the observer's eyes.

An alternative embodiment provides for a head-mounted projection display system that has: a head mount worn by an observer; a head position sensor coupled to the head mount to provide angular position signals indicative of the observer's angular head position; at least one image generator for each eye of the observer to receive the angular position signals and generate display signals of binocular images; a transmitter that receives the generated display signals; and at least one beam splitter for each eye, selectively transmissive and positioned at different angles one from another, connected to the head mount to reflect the binocular images to the retro-reflective viewing screen, the images reflected from the retro-reflective screen back into each of the observer's eyes.

BRIEF DESCRIPTION OF THE DRAWINGS

In the drawings, which constitute a part of this specification, an exemplary embodiment exhibiting various objectives and features hereof is set forth, specifically:

FIG. 3 is an orthogonal view of the head-mounted projection display system hereof;

FIG. 4 is an offset vertical cross-sectional view taken vertically through the head-mounted display system of FIG. 3.

DETAILED DESCRIPTION

As required, a detailed illustrative embodiment of the present invention is disclosed herein. However, the head-mounted projection display system featuring a beam splitter in accordance with the present invention may be embodied in a wide variety of forms, some of which may be quite different from those of the disclosed embodiment, as shown by example in FIGS. 1 and 5.

Consequently, the specific structural and functional details disclosed herein are merely representative; yet in that regard, they are deemed to afford the best embodiment for purposes of disclosure and to provide a basis for the claims herein which define the scope of the present invention.

As shown in the accompanying figures, the head-mounted projection display system includes: a head-mounted projector, image generator and processor, a head position sensor, one or more beam splitters and a retro-reflective screen. Note that these elements of the system are well known individually and therefore are not disclosed in structural detail.

The head-mounted projectors receive identical inset and background images from a projector source that is connected to receive signals for a dynamic image generated by the image processor. Accordingly, the projector reduces the display signals to a pair of binocular images and projects these images, while a processor evaluates feedback from a head position sensor and compensates for angular head position changes made by the observer. The projected binocular images are partially reflected from the beam splitter toward a retro-reflective screen. The retro-reflective screen reflects back the co-located images directly into the observer's eyes, through the beam splitter.

By incorporating two head-mounted projectors into the head-mounted projection display system, specifically, one for each eye, binocular overlap of the images reflected from the screen is unlimited. Consequently, the observer experiences a wide and natural field of view.

Figure 1:
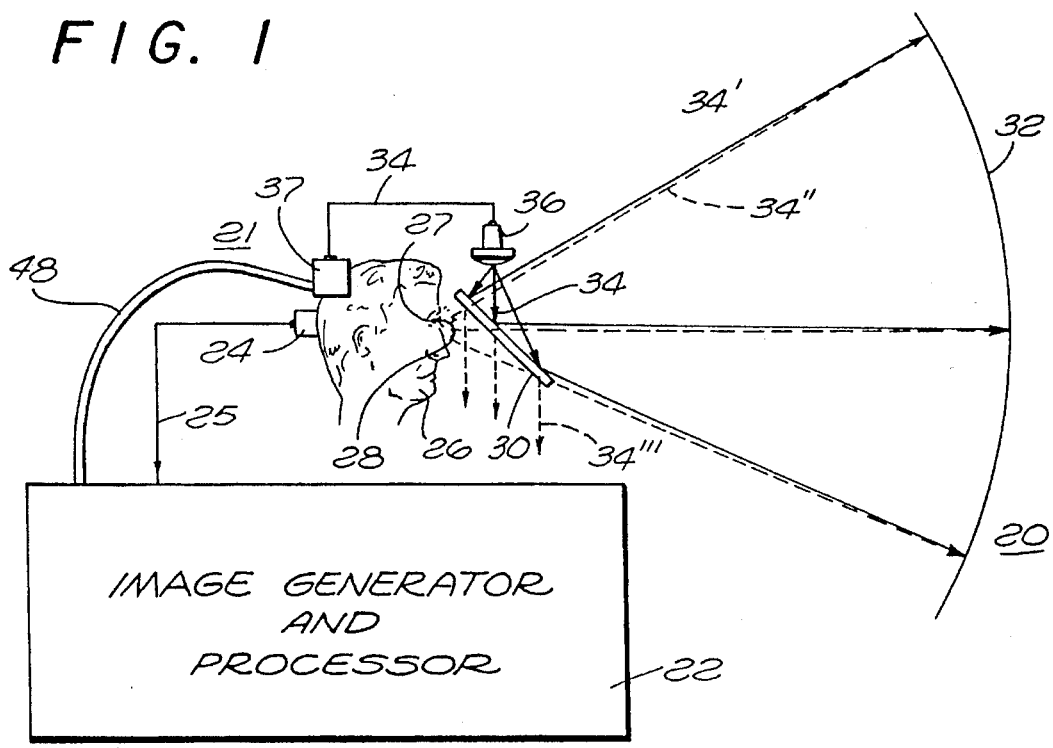
FIG. 1 is a schematic representation side view of the head-mounted projection display system illustrating a beam splitter for co-location.

FIG. 1 is a schematic representation side view of the head-mounted projection display system 20 featuring the beam splitter 30 and serving to illustrate a co-location arrangement for the projected images and the viewer's eyes. The head-mounted projection display system 20 can be easily mounted onto a helmet, or other head mount not shown here. A head-mounted projector apparatus 21 incorporates a cathode ray tube 36 as an illustrative image source that projects binocular light beams 34 produced by the image generator and processor 22. In one embodiment, the light beams indicated generally at 34 in the form of a 5 mm cone of light, are focused through lens 36 into a point of light striking a beam splitter 30 which functions as a selectively reflecting surface transmitting approximately fifty percent of the reflected light beam 34' to a retro-reflective screen 32. A normal reflective screen will not return much of the projected image to the eye. Fifty percent of the light energy of an exemplary beam 34 is lost by the beam splitter 30, here. The light beam 34' bounces back through the beam splitter 30 into the observer's eye 27 as an image beam 34". The return reflected image beam 34" is fifty percent of the beam 34' reflected. As a result of the co-location, the screen-reflected image beam 34" appears to the observer 26 as an image projected within the observer's eyes 27 and 27'.

In operation, the observer 26 wearing the head-mounted projection display system 20 sees the light beam 34' striking the screen 32 and the resultant image beam 34" striking his eye 27. Another observer not wearing the head-mounted apparatus 21 will not see the images. The observer 26 can move his eye 27 within a ½" range, for example, up, down, left or right and still see the image beam 34", because each image beam 34" is projected directly onto the observer's pupil 28. The image beam 34" is approximately twenty-five percent of the generated light beam 34.

Because the projected beams are oriented with the observer's head, linear head motion along or normal to the optical axis by the observer 26 does not affect the observer's viewing of the projected images. The image beams 34" will appear to the observer 26 to move with his linear head motion exactly as if there were an infinite distance separating the projected images from the observer 26. The illusion is maintained during image simulation of an infinite distance between the observer 26 and the projected image, while the observer's eye 27 is focusing on the image on the retro-reflective screen 32.

In the head-mounted projection display system 20 of FIG. 1, angular head motion by the observer 26 must be compensated. The head position sensor 24 controls the image generator and processor 22, determining where detail within the image beam 34" must move to provide correct perspective within the infinite viewing distance for the observer 26. Specifically, feedback signals are provided through a line 25 from the head position sensor 24 for processing in the image generator and processor 22. Angular motion compensation is received by the head-mounted projection apparatus 21 through data bus 48. In this example, the data bus 48 is a wire.

As suggested above, each of the image beams 34, 34' and 34" carry one of a pair of binocular images. The two sets of beams are shown more clearly in FIG. 2, also see FIGS. 3 and 4. Note that in FIG. 1, the image beam 34''' represents the 50 percent of the image beam 34 lost through the selectively transmissive beam splitter 30.

Figure 2:
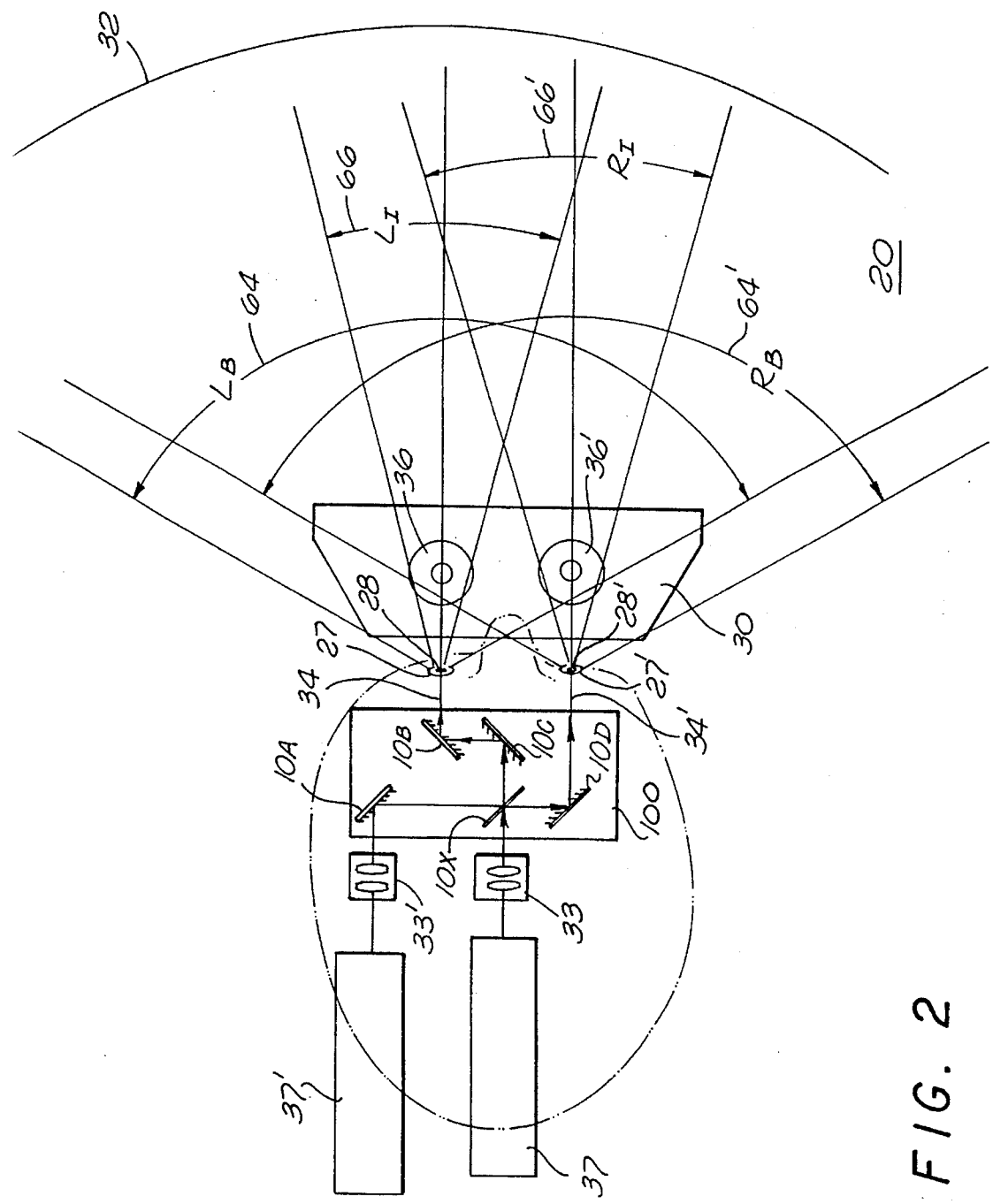
FIG. 2 is a schematic representation top view of inset images projected from a head-mounted projection display system and having unlimited binocular overlap.

FIG. 2 is a schematic representation top view of an image projected from a head-mounted projection display system having unlimited binocular overlap. Some elements are not shown so as to illustrate the beam paths.

The single beam splitter concept as shown in top view FIG. 2 uses two image generators, here cathode ray tubes 37 and 37' (CRT) to obtain these fields of view. The image projected from CRT 37 enters background optical relay 33 and is split into two images by combining optics 100. These two identical images are projected simultaneously downward by mirrors 103 (FIGS. 3 and 4) and the two projection lenses 36, 36' from the beam splitter 30 toward flat or curved retro-reflective screen 32. These two identical images 34, 34' co-located with the viewers eyes, impinge the screen 32 and are returned from the retro-reflective screen to each eye 27, 27'.

Recapitulating to some extent, the beams 34 and 34', each carry a background portion and an inset portion and are formed by the optics 100 to be projected downwardly on the beam splitter 30 for a co-location projection to the screen 32. Within the optics 100, mirrors 10A, 10B, 10C and 10D operate with a beam splitter 10X to combine inset and background images as two co-located beams 34 and 34'. Essentially, as illustrated, inset image (from CRT 37') impinges on the mirror 10A, the beam splitter 10X and the mirrors 10C and 10B. The background image (from CRT 37) impinges the beam splitter 10X and the mirror 10D. Thus, the inset image is aligned within the background image in both two separate beams for co-location with the eyes and projected to the screen 32.

Thus, the wide field of view (background) image is projected at a range of approximately 120° to 140° horizontally. However, it is of low resolution, for example approximately 8 arc minutes of resolution. The other projector, CRT 37' also projects an inset narrow field of view of for example approximately 40° to both eyes 27, 27' providing images having high resolution, of approximately 2 arc minutes. The use of background and inset optics produces an image display to the observer 26 that have both wide field supporting his peripheral vision and high resolution at the center of the image display. This high resolution area is commonly called the observer's "area of interest" or inset region while the observer's wider field of view is referred to as his background region.

In FIG. 2, two separate cathode ray tubes 37, 37' each project to both the observer's right and left eyes 27 and 27', respectively. As indicated, cathode ray tube 37' projects narrow field, high resolution light beams 66, 66' to both of the observer's pupils 28, 28' through a single beam splitter 30. Simultaneously cathode ray tube 37 projects a wide field light beam 64, 64' through beam splitter 30 to both the observer's eyes 27, 27'. As shown in FIG. 2 the observer 26 views the image beams 64, 64', 66 and 66' as left background image (LB), right background image (RB), left inset image (LI) and right inset image (RI), respectively.

FIG. 3 is an orthogonal partial view of the head-mounted projection display system 20. The observer 26 wears the head-mounted projection display system 20 shown here on support mounting band 70. As explained above, the observer's eyes 27 and 27' view the screen (not shown here) through the beam splitter 30 which is held by a beam splitter support bracket 74. Projection lens' 36, 36' are positioned above the beam splitter 30 along with mirrors 103. Cathode ray tube covers 72, 72' are mounted to the support mounting band 70. Display signals are received by the cathode ray tubes (not shown here) housed within the cathode ray tubes covers 72, 72' through electrical wires 48, 48'. Counter weights 71 counter balance the weight of the beam splitter 30 and projection lenses 36 and 36' facilitating the position of the head-mounted projection display system 20 on the head of observer 26.

FIG. 4 is an offset vertical cross section view taken through the head-mounted projection display system of FIG. 3. The head-mounted display system 20 with unlimited binocular overlap projects an image 34" to the pupil 28 of the observer's eye 27 A flat screen 32' shown in this example, reflects through beam splitter 30 into the observer's left pupil 28 the light beam 34 emitted from lens 36 and cathode ray tube 37 through an optical relay 33. The light beam 34' is selectively reflected through the beam splitter 30 where fifty percent of the light energy 34''' is lost. The image is viewed by the observer from screen 32' as image beam 34". The left cathode ray tube cover 72 contains the cathode ray tube 37, optical relay 33, a series of lens or a fiber optic bundle coupling half of the output from the cathode ray tube 37 to lens 36 mounted on the observer's head. One half of the light from the CRT is coupled to the other projection lens 36'.

This head-mounted projection display system offers the best advantages of projection dome displays, such as large field of view, good eye relief, good pupil size and full binocular view plus the low cost and small size of the helmet-mounted direct view display.

Figure 5:
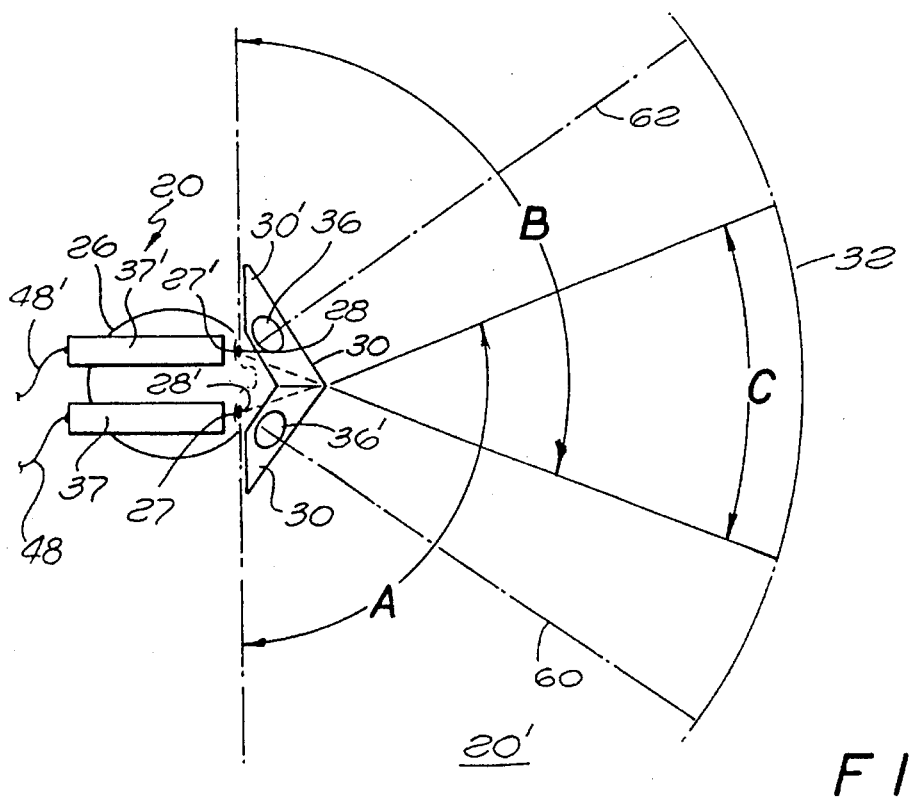
FIG. 5 is an additional embodiment, a schematic representation top view of an image projected for the head-mounted projection display system having limited binocular overlap.

An alternative embodiment of the head-mounted projection system 20' is shown in FIG. 5. This system 20' requires a separate projection cathode ray tube for each eye 27, 27' because dual beam splitters 30, 30' either one piece or two pieces are positioned at different angles over each eye. For example, the beam splitters 30, 30' would be positioned inclined in the vertical plane at 45° while inclined in the horizontal plane 90° to the observer's eyes. These angles are approximate in nature and can vary in a range of 10° plus or minus. The combining optics of the system described in detail by FIGS. 1, 2, 3 and 4 are eliminated from this design. The embodiment of FIG. 5 has the advantage of providing unlimited field of view (A+B) with limited binocular overlap (C). The necessity of adding an inset image would increase the number of projectors used from two projectors to four. Therefore, this system 20' provides a concept that is physically heavier, more complex and ultimately more costly than the system 20 described in FIGS. 1, 2, 3 and 4. Four distinct and separate image generators, here cathode ray tubes, would provide four slightly different images but with added system cost and weight.

The head-mounted projection display system 20' of FIG. 5 has a vertical field of view theoretically limited by the beam splitters 30, 30' to 90°. Images as electrical signals enter the projectors 37, 37' through electrical wires 48, 48'. Image beams 62 and 60 are emitted from projection lenses 36, 36' respectively. The image beams 60, 62 impinge the retro-reflective screen 32, shown covered in this example. The observer 26, with his right eye 27 and left eye 27' views a right eye field of view A and a left eye field view of B, respectively, reflected from flat or curved retro-reflective screen 32. Binocular overlap region C is the region viewed by observer 26 where A and B overlap.

Hence, as shown in the embodiment of FIGS. 2, 3 and 4, the optical co-location of the projectors for the observer's pupils 28, 28' provides the observer 26 with a wider field of view. However, the horizontal field of view is still limited to 120° to 140°. This horizontal field limitation can be eliminated through the alternative embodiment shown in FIG. 5, however, full binocular coverage for the observer suffers.

Another advantage is the head-mounted projection display system's insensitivity to screen surface imperfections. These imperfections which traditionally occur in different areas of the two pictures projected upon the screen are thus ignored by the observer's brain. Consequently an expensive, continuous, high quality dome surface is not required as with conventional wide field of view projection simulator displays. Simple, flat panel screen surfaces are adequate to provide wide field of view projection simulation. For example, a basic one frequency icosahedron, provides unlimited field of view capability for the described head-mounted projection display system.

The head-mounted projection display system described herein has been directed toward flight simulators and the like. However, it is not outside the scope of the disclosed projection system to be employed in any environmental simulation including, but not limited to; video games, land based vehicles, motion pictures or any other video graphic displays.

In view of the above explanation of the exemplary system, it will be appreciated that embodiments of the present invention may be employed in many different applications to achieve for an observer an unlimited field of view while wearing the head-mounted projection display system featuring a beam splitter and limited binocular overlap. While certain exemplary structures and operations have been described herein, the appropriate scope hereof is deemed to be in accordance with the claims as set forth below.

What is claimed is:

1. A head-mounted projection display system for providing a display to the eyes of an observer, comprising:

a retro-reflective screen; and a head-mounted projector for use with said retro-reflective screen, further comprising:

a head mount to be worn by the observer;

a head position sensor means coupled to said head mount for providing angular position signals indicative of the angular position of the observer's head;

an image generator means providing display signals representative of binocular dynamic displays for the observer and connected to receive said angular position signals to control said display signals;

at least one pair of binocular image means affixed to said head mount and connected to receive said display signals for projecting a pair of binocular images; and a beam splitter means including a pair of beam splitters affixed to said head mount and positioned at different angles over each of the observer's eyes for separately reflecting said pair of binocular images onto said retro-reflective viewing screen, said beam splitter means optically co-locating said pair of binocular images reflected onto said retro-reflective viewing screen and diverging with limited binocular overlap with the eyes of the observer by passing said pair of binocular images from said retro-reflective viewing screen back to the observer through said beam splitter means to provide a substantially unlimited field of view, where a right one of said pair or binocular images appears to the observer as an image projected directly onto a right pupil of the observer's eyes and a left one of said pair of binocular images appears to the observer as an image projected directly onto a left pupil of the observer's eyes such that a right one of the observer's eyes only sees a right one of the pair of binocular images and a left one of the observer's eyes only sees a left one of the pair of binocular images.

2. The head-mounted projection display system in accordance with claim 1, wherein said image generator means comprises a cathode ray tube.

3. A head-mounted projection display system in accordance with claim 1, wherein said image generator means provides both a background image and an inset image and includes means for incorporating said background and inset images in each of said binocular dynamic displays.

4. A head-mounted projection display system in accordance with claim 1, wherein said angular position signals are applied to said image generator means to vary said dynamic displays.

5. A head-mounted projection display system in accordance with claim 1, wherein said image generator means includes:

means for providing background and inset images;

means for combining said background and inset images as two display beams; and means for directing said display beams through said beam splitter to impact said viewing screen.

6. A head-mounted projection display system in accordance with claim 1, wherein said pair of display beams are reflected from said beam splitter to impact said retro-reflective viewing screen to be returned as viewing beams through said beam splitter.

7. A head-mounted projection display system in accordance with claim 1, wherein said angular position signals are applied to said image generator means to vary said dynamic displays.

8. A head-mounted projection display system for use with a retro-reflective screen for providing a display to the eyes of an observer, comprising:

a head mount to be worn by the observer;

a head position sensor means coupled to said head mount for providing angular position signals indicative of the angular position of the observer's head;

an image generator means providing display signals representative of binocular dynamic displays for the observer and connected to receive said angular position signals to control said display signals;

at least one pair of binocular image means affixed to said head mount and connected to receive said display signals for projecting a pair of binocular images; and a beam splitter means including a pair of beam splitters affixed to said head mount wherein said beam splitter means comprises a first and a second beam splitter, said first and second beam splitters inclined in a vertical plane approximately at 45 degrees and oppositely inclined in the horizontal plane approximately at 90 degrees for separately reflecting said pair of binocular images to said retro-reflective viewing screen, said pair of binocular images optically co-located with the eyes of the observer and diverging with limited binocular overlap and further, said beam splitter means passing said pair of binocular images from said retro-reflective viewing screen back to the observer to provide a substantially unlimited field of view.

9. The head-mounted projection display system of claim 8, wherein said image generator means comprises a cathode ray tube.

10. A head-mounted projection display system in accordance with claim 8, wherein said image generator means provides both a background image and an inset image and includes means for incorporating said background and inset images in each of said binocular dynamic displays.

11. A head-mounted projection display system in accordance with claim 8, wherein said angular position signals are applied to said image generator means to vary said dynamic displays.

12. A head-mounted projection display system in accordance with claim 8, wherein said image generator means includes:

means for providing background and inset images;

means for combining said background and inset images as two display beams; and means for directing said display beams through said beam splitter to impact said viewing screen.

13. A head-mounted projection display system according to claim 8, wherein said pair of display beams are reflected from said beam splitter to impact said retro-reflective viewing screen to be returned as viewing beams through said beam splitter.

14. A head-mounted projection display system according to claim 8, wherein said angular position signals are applied to said image generator means to vary said dynamic displays.

* * * * *